United States Patent
Wackerly (10) Patent No.: US 10,218,534 B2
(45) Date of Patent: Feb. 26, 2019

(54) DETERMINATION OF A NETWORK CLOUD CONTAINING AN UNCONTROLLED NETWORK DEVICE BASED ON LINK DATA OF CONTROLLED NETWORK DEVICES

(71) Applicant: HEWLETT PACKARD ENTERPRISE DEVELOPMENT LP, Houston, TX (US)

(72) Inventor: Shaun Wackerly, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 6 days.

(21) Appl. No.: 15/312,258

(22) PCT Filed: Jun. 30, 2014

(86) PCT No.: PCT/US2014/044900
§ 371 (c)(1),
(2) Date: Nov. 18, 2016

(87) PCT Pub. No.: WO2016/003420
PCT Pub. Date: Jan. 7, 2016

(65) Prior Publication Data
US 2017/0170980 A1   Jun. 15, 2017

(51) Int. Cl.
| H04L 12/28 | (2006.01) |
| H04L 29/14 | (2006.01) |
| G06F 3/048 | (2013.01) |
| G06F 9/4401 | (2018.01) |
| G06F 9/455 | (2018.01) |
(Continued)

(52) U.S. Cl.
CPC .......... *H04L 12/2861* (2013.01); *G06F 3/048* (2013.01); *G06F 9/4401* (2013.01); *G06F 9/45533* (2013.01); *G11B 20/10009* (2013.01); *H04B 1/713* (2013.01); *H04L 5/0012* (2013.01); *H04L 29/02* (2013.01); *H04L 41/0803* (2013.01); *H04L 41/0893* (2013.01);
(Continued)

(58) Field of Classification Search
None
See application file for complete search history.

(56) References Cited

U.S. PATENT DOCUMENTS 8,125,927 B2   2/2012   Nandy et al.
8,560,647 B2   10/2013  Zhang et al.
(Continued)

OTHER PUBLICATIONS

Hui Lu et al., "HybNET: Network Manager for a Hybrid Network Infrastructure," Aug. 12, 2013, p. 1-6, NEC Laboratories America, Available at: <nec-labs.com/~lume/files/hybnet-middleware.pdf>.
(Continued)

*Primary Examiner* — Otis L Thompson, Jr.
(74) *Attorney, Agent, or Firm* — Sheppard Mullin Richer & Hampton LLP (57) ABSTRACT

Systems, methods, and storage mediums for determining a network cloud containing an uncontrolled network device based on link data of controlled network devices. The link data of controlled network devices can indicate which controlled network devices are linked together, whether the links between controlled network devices are multi-hop links, and whether the links between controlled network devices are bi-directional.

20 Claims, 5 Drawing Sheets

(51) Int. Cl.
  *G11B 20/10* (2006.01)
  *H04B 1/713* (2011.01)
  *H04L 5/00* (2006.01)
  *H04L 29/02* (2006.01)
  *H04L 12/24* (2006.01)

(52) U.S. Cl.
  CPC .............. *H04L 41/12* (2013.01); *H04L 69/40* (2013.01); *H04L 41/06* (2013.01)

(56) References Cited

U.S. PATENT DOCUMENTS

| | | | |
|---|---|---|---|
| 2003/0097438 A1* | 5/2003 | Bearden | H04L 41/0213 709/224 |
| 2006/0274673 A1 | 12/2006 | Fleury et al. | |
| 2009/0122710 A1* | 5/2009 | Bar-Tor | H04L 41/0631 370/250 |
| 2009/0175252 A1 | 7/2009 | Sato | |
| 2009/0290513 A1 | 11/2009 | Swan | |
| 2013/0223277 A1* | 8/2013 | DeCusatis | H04L 67/1097 370/254 |
| 2013/0268638 A1 | 10/2013 | Anderson et al. | |
| 2013/0322298 A1 | 12/2013 | Alexander, Jr. | |
| 2014/0112190 A1 | 4/2014 | Chou et al. | |
| 2014/0241247 A1* | 8/2014 | Kempf | H04L 12/4633 370/328 |
| 2015/0117269 A1* | 4/2015 | Navalekar | H04L 5/143 370/277 |
| 2017/0273084 A1* | 9/2017 | Yi | H04W 72/0453 |
| 2017/0310574 A1* | 10/2017 | Wolting | H04L 45/02 |

OTHER PUBLICATIONS

International Search Report, International Application No. PCT/US2014/044900, dated Feb. 4, 2015, pp. 1-3, KIPO.

* cited by examiner

DETERMINATION OF A NETWORK CLOUD CONTAINING AN UNCONTROLLED NETWORK DEVICE BASED ON LINK DATA OF CONTROLLED NETWORK DEVICES

BACKGROUND

Computer networks can include numerous devices for transmitting data through the network. Logical topology maps, which depict how each network device is connected within the network, can be useful for troubleshooting connectivity issues and for the design and maintenance of the network. Although topology maps can be manually created, automatically generated maps are often used for frequently updated or complicated network layouts.

DETAILED DESCRIPTION

Logical topology maps are often used for mapping computer networks in which every network device is controlled by the same network controller. However, when a computer network also includes one or more uncontrolled network devices (herein referred to as a "heterogeneous" network), mapping such a network can be challenging. For example, in some cases, a network administrator may receive only limited information about the connectivity of uncontrolled network devices from the control plane of the network. As a result, a logical topology map created based on this information may include misleading links between devices and/or may include duplicative network devices based on assumptions regarding the layout of the network.

In some cases, the mapping of a heterogeneous network can be assisted with information provided by a source outside of the network's control plane (e.g., from a network administrator with actual knowledge of the network's layout). However, it is often advantageous to be able to map a network without relying on such outside sources. For example, in some cases, it can be advantageous to be able to accurately map a heterogeneous network based on information in the control plane of devices within the network.

A method for addressing these issues can include a first step of detecting a fully-connected cloud that contains one or more uncontrolled network devices. The method can further include querying the controlled network devices within the network to determine an estimate of the size of the cloud. This querying step can, for example, be accomplished by querying address tables for controlled network devices to determine which uncontrolled network devices, if any, may be contained within an uncontrolled cloud. The method can further include generating and displaying a logical topology map depicting the detected cloud.

Figure 1:
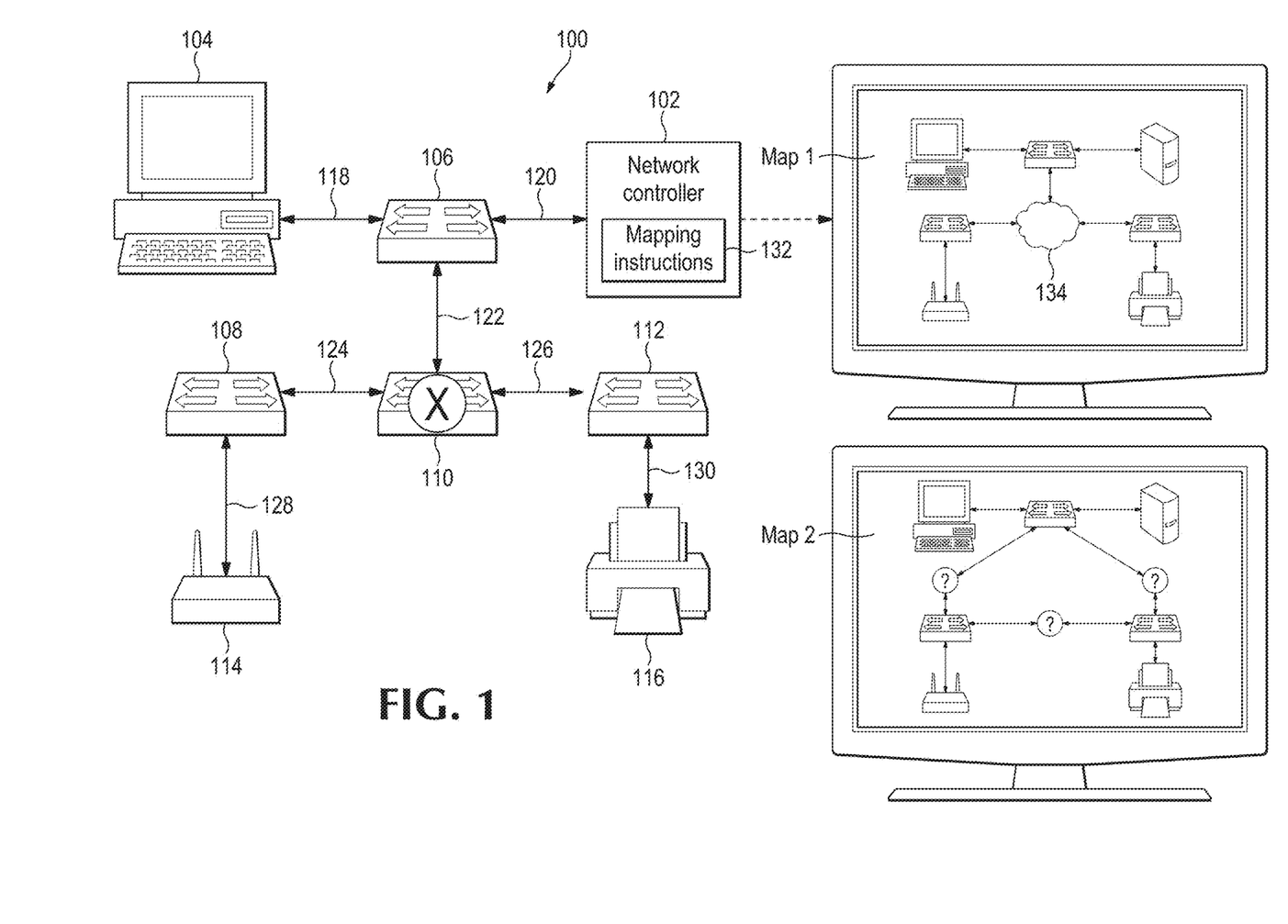
FIG. 1 is a diagram of a computer network including a network controller according to an example, along with two examples of logical topology maps of the network.

FIG. 1 illustrates an example of a heterogeneous network 100 that includes a network controller 102 connected to multiple network devices 104, 106, 108, 110, 112, 114, and 116 via wired or wireless data links 118, 120, 122, 124, 126, 128, and 130. Network 100 can be implemented as a software-defined network (SDN), with network controller 102 being configured to interface with the various network devices via a suitable Application Program Interface ("API"), or another suitable routing protocol (e.g., Open-Flow and/or simple network management protocol (SNMP)). In some implementations, network controller 102 can be implemented as a standalone network device in network 100. For example, in some implementations, network controller 102 can be in the form of a software program on a computer system connected to network 100. Alternatively or in addition, network controller 102 can be implemented within another network device in network 100, such as within a host, switch, gateway, etc. It is further appreciated that the functions of network controller 102 may be split among multiple controllers or other devices throughout network 100.

In this example, the various network devices of network 100 are in the form of a personal computer 104, network switches 106, 108, 110, and 112, a wireless router 114, and a printer 116. Although FIG. 1 depicts a certain number and arrangement of network devices, it is appreciated that the improved systems, methods, and mediums described herein can be used or adapted for networks including more or fewer devices, different types of devices, and different network arrangements. For example, in some implementations, one or more of the various network devices can be in the form of suitable data communication equipment, such as suitable modems, hubs, bridges or switches. In some implementations, one or more of the various network devices can be in the form of suitable data terminal equipment, such as suitable digital telephone handsets, printers, host computers, routers, workstations, or servers.

Several of the device in network 100 are "controlled" by network controller 102 (e.g., controlled network devices 106, 108, 112). The term "controlled" as used herein in reference to a network device is intended to include a device in network 100 that is within the control plane of network controller 102. The term is further intended to include a device for which topological link data information is shared with network controller 102 or another computing system for mapping network 100. As further described below, such topological link data can, for example, include data regarding which controlled network devices in the network are linked together, whether the links between controlled network devices are single-hop or multi-hop, and whether the links between controlled network devices are bi-directional or uni-directional. An example of a network in which topological link data information is shared between network controllers is described below with respect to FIG. 6.

Network 100 further includes at least one device that is "uncontrolled" (e.g., device 110). The term "uncontrolled" as used herein in reference to a network device is intended to refer to a device in network 100 that is not within the control plane of network controller 102 and for which topological link data information is not shared with network controller 102 or another computing system that maps network 100.

As depicted in FIG. 1, network controller 102 includes mapping instructions 132 for producing a topological map 1 of network 100. Map 1 is produced by the systems, methods, and mediums described herein and can be compared to an alternative map 2, which can unintentionally misrepresent the topology of network 100 by depicting network 100 as including three non-intersecting multi-hop links between controlled network devices. Because the network layout depicted in map 1 is displayed in a simpler and more accurate fashion compared to the connectivity of map 2, problematic connectivity can be more visually apparent to a user. It is further appreciated that the representation of network 100 in map 1 better matches how a user might draw a logical diagram of network 100 if the user had complete knowledge of the network's layout, including the arrangement of each uncontrolled network device.

In particular, mapping instructions 132 can be used to determine whether network 100 contains a fully-connected cloud containing an uncontrolled network device. This determination can, for example, be based on link data of controlled network devices within network 100. For example, in some implementations, mapping instructions 132 can include instructions to determine whether at least three controlled network devices (e.g., devices 106, 108, and 112) are connected to each other through respective multi-hop bi-directional links that each contain an uncontrolled network device. Although the identity of the uncontrolled network device (i.e., device 110) along the multi-hop link may not be visible to controller 102 along the control plane, controller 102 can assume that an uncontrolled network device exists if there are no other controlled network devices between the controlled network devices along the multi-hop link.

Mapping instructions 132 can further include instructions to designate the three controlled network devices as being connected to a cloud (e.g., cloud 134 in map 1) containing an uncontrolled network device. Additional examples of mapping instructions 132 are described below, and can include, for example, instructions corresponding to the methods described with respect to FIG. 4.

A logical topology map created by the systems, methods, and mediums described herein can, for example, be in a form suitable for display to a network administrator or other user. For example, in some implementations, the map is in the form of a graphical user interface (GUI) displayed on a screen of a computing device, such as a computer monitor. In some implementations, the map is printed onto a sheet of paper or other physical media. It is appreciated that the map can include additional information regarding elements of a network, such as icons depicting the makes and models of controlled network devices, symbols representing the type of link between devices (e.g., wired, wireless, etc.), and the like. As illustrated in FIG. 1, an identified cloud (e.g., cloud 134) may be depicted on the map with a cloud-shaped icon. It is appreciated that another suitable shape for depicting the cloud may be used. For example, in some implementations, the cloud may be depicted as a circle, square or other desired shape.

In some implementations, the logical topology map can be returned to a caller in a storage format without being converted into a GUI. For example, in some implementations, the logical topology map can be in the form of a logical representation that provides structure mappings in which certain structures correspond to clouds and other structures correspond to switches or other network devices. Such an implementation can, for example, be used where a machine displaying a GUI for the map is a separate machine from the controller that maps the network.

Figure 2:
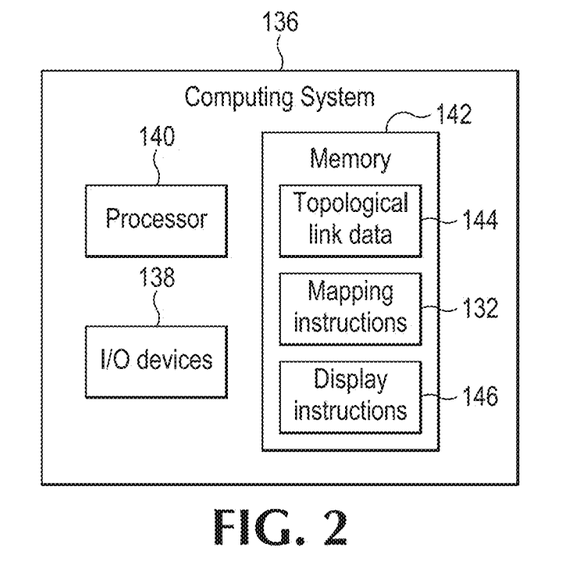
FIG. 2 is a computing system including mapping instructions for generating a logical topology map of a computer network, according to an example.

FIG. 2 illustrates an example of a computing system 136 that can create a logical topology map for a network. For illustration, the description of computing system 136 refers to elements of network 100, however, it is appreciated that computing system 136 can be used to create a logical topology map for any suitable network. Computing system 136 can be in the form of any suitable system for such determination. For example, computing system 136 can be in the form of network controller 102 and can, for example, include mapping instructions 132 stored on a hard drive of network controller 102. In some implementations, computing system 136 can be in the form of another computing device, such as a standalone personal computer, such as a desktop computer, laptop, tablet, or the like.

In some implementations, computing system 136 may be a separate unit that is in data communication with network controller 102 via a wired or wireless connection so as to receive information from network controller 102 for creating a topology map. In implementations where computing system 136 is a separate unit from network controller 102, computing system 136 may receive information from network controller 102 through indirect means. For example, computing system 136 may be configured to receive information from network controller 102 by inserting a removable data storage device into computing system 136. In such an example, the removable data storage device can, for example, be in the form of a USB thumb drive or a storage disc containing information from network controller 102.

As depicted in FIG. 2, computing system 136 can include input/output (I/O) devices 138, a processor 140, and a memory 142. I/O devices 138 can include, for example, a monitor and/or printer for displaying the topology map created by computing system 136, I/O devices 138 can additionally or alternatively include a keyboard, mouse, stylus, touchscreen, speaker, monitor, etc., to allow communication to and from computing system 136.

Processor 140 can, for example, be in the form of a central processing unit (CPU), a semiconductor-based microprocessor, a digital signal processor (DSP) such as a digital image processing unit, other hardware devices or processing elements suitable to retrieve and execute instructions stored in memory 142, or combinations thereof. Processor 140 can, for example, include single or multiple cores on a chip, multiple cores across multiple chips, multiple cores across multiple devices, or combinations thereof. Processor 140 can be functional to fetch, decode, and execute instructions as described herein. As an alternative or in addition to retrieving and executing instructions, processor 140 may include at least one integrated circuit (IC), other control logic, other electronic circuits, or combinations thereof that include a number of electronic components for performing the functionality of instructions stored on memory 142. Processor 140 may be implemented across multiple processing units and instructions may be implemented by different processing units in different areas of computing system 136.

Memory 142 can, for example, be in the form of a non-transitory machine-readable storage medium, such as a suitable electronic, magnetic, optical, or other physical storage apparatus to contain or store information such as executable instructions, data, and the like. As used herein, the term "machine-readable storage medium" may include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory 142 can include a main memory, such as a Random Access Memory (RAM), where software may reside during runtime, and a secondary memory. The secondary memory can, for example, include a nonvolatile memory where a copy of software is stored.

Memory 142 may store topological link data 144 for controlled network devices in network 100. As described above with respect to FIG. 1, topological link data 144 can indicate: (1) which controlled network devices in the network are linked together, (2) whether the links between controlled network devices are single-hop or multi-hop, and (3) whether the links between controlled network devices are bi-directional or uni-directional. Topological link data 144 can, for example, include information regarding which port of a controlled network device is used for communicating with another controlled network device. It is appreciated that topological link data 144 can include further information to assist in mapping the network.

For example, in some implementations, topological link data 144 can include media access control (MAC) address information for an uncontrolled network device linked to a controlled network device. In some implementations, the topological link data can include data in the form of another addressing scheme, such as Internet Protocol (IP) address or Address Resolution Protocol (ARP), for associating an address and a port used for that address.

Memory 142 can include display instructions 146 that are executable by processor 140 such that computing system 136 is operative to display a topology map that identifies controlled network devices being connected to the fully-connected cloud. For example, as depicted in map 1 of FIG. 1, display instructions 146 can include instructions to replace individual links between controlled network devices with a single link from each controlled network device to the cloud. In some implementations, display instructions 146 can be executable by processor 140 such that computing system 136 (i.e., a first system is operative to provide mapping instructions 132 or related information to a "second" system so as display a topology map (e.g., map 1) created by computing system 136 on the second system.

Figure 3:
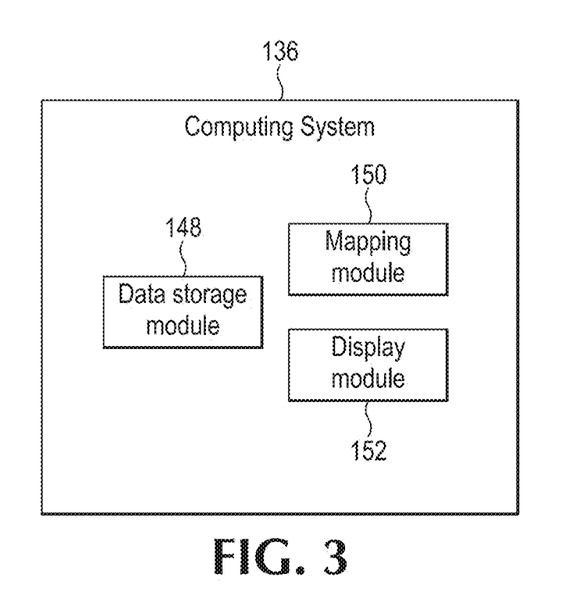
FIG. 3 is a computing system including a mapping module for generating a logical topology map of a computer network, according to an example.

FIG. 3 illustrates computing system 136 in the form of functional modules. In particular, computing system 136 includes a data storage module 148, a mapping module 150, and a display module 152. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or at hardware and software hosted at hardware. Additionally, as used herein, the singular forms "a" "an," and "the" include plural referents unless the context clearly dictates otherwise. Thus, for example, the term "module" is intended to mean one or more modules or a combination of modules.

Data storage module 148 is a functional module of computing system 136 that includes a combination of hardware and software that allows computing system 136 to store data for use in creating a logical topology map. In some implementations, data storage module 148 includes hardware in the form of a hard drive, related firmware, and other software for allowing the hard drive to operatively communicate with other hardware of computing system 136. Data storage module 148 further includes information that is stored within data storage module 148, such as topological link data 144 described above with respect to FIG. 2.

Mapping module 150 is a functional module of computing system 136 that includes a combination of hardware and software that allows computing system 136 to determine a logical topology map of a network. In some implementations, mapping module 150 includes hardware in the form of a microprocessor on a single integrated circuit, related firmware, and other software for allowing the microprocessor to operatively communicate with other hardware of computing system 136. Mapping module 150 further includes instructions used by computing system 136 to determine the logical topology map of a network, such as mapping instructions 132 described above with respect to FIG. 2.

Display module 152 is a functional module of computing system 136 that includes a combination of hardware and software that allows computing system 136 to display a logical topology map of a network. In some implementations, display module 152 includes hardware in the form of a computer monitor, related firmware, and other software for allowing the computer monitor to operatively communicate with other hardware of computing system 136. It is appreciated that in some embodiments, display module 152 can include hardware in the form of a display port and/or video card. Display module 152 further includes instructions used by computing system 136 to display the logical topology map of a network. Such instructions can include, for example, display instructions 146 described above with respect to FIG. 2. In some implementations, display module 152 can additionally or alternatively include hardware in the form of a computer printer or printer port, related firmware, and other software for allowing a printer to operatively communicate with other hardware of computing system 136.

Figure 4:
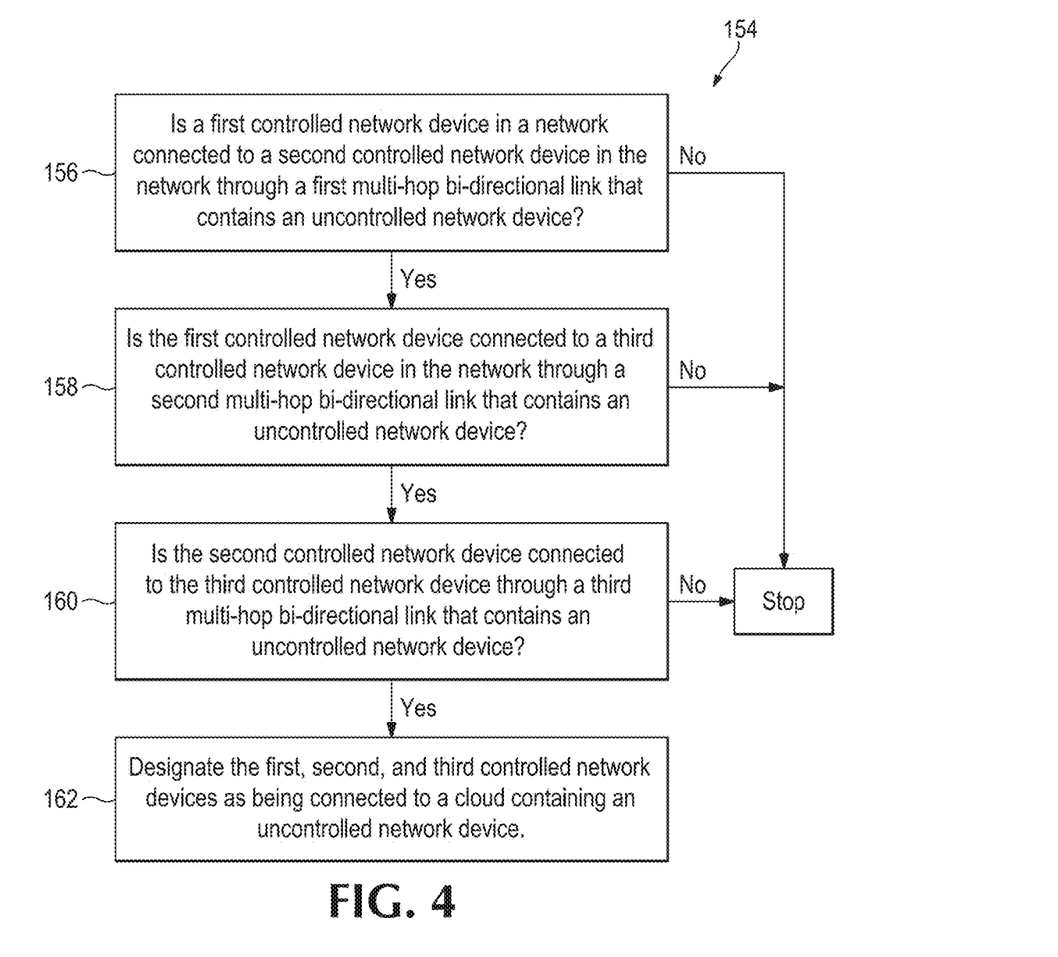
FIG. 4 is a flowchart of an improved method for determining a network cloud containing an uncontrolled network device based on link data of controlled network devices, according to an example.

FIG. 4 illustrates an example of a method 154 that can, for example, be implemented by a computing system for determining the logical topology of a network. For illustration, the description of method 154 refers to elements of computing system 136, network 100, and map 1, however, it is appreciated that method 154 can be used for any suitable network. Moreover, although the flowchart of FIG. 4 shows a specific order of performance of functionalities of method 154, this method is not limited to this order. For example, the functionalities shown in succession in the flowchart may be performed in a different order, may be executed concurrently or with partial concurrence, or a combination thereof.

Method 154 includes a step 156 of determining whether a first controlled network device (e.g., device 106) in a network (e.g., network 100) is connected to a second controlled network device (e.g., device 108) in the network through a first multi-hop bi-directional link (e.g., the link formed by link 122 and link 124) that contains an uncontrolled network device. Although the identity of the uncontrolled network device (e.g., device 110) along the multi-hop link may not be visible to controller 102 along the control plane, controller 102 can assume that an uncontrolled network device exists if there are no other controlled network devices between the first controlled network device and the second controlled network device along the multi-hop link.

Method 154 further includes a step 158 of determining whether the first controlled network device is connected to a third controlled network device (e.g., device 112) in the network through a second multi-hop bi-directional link (e.g., the link formed by link 122 and link 126) that contains an uncontrolled network device. As described above, although the identity of the uncontrolled network device (e.g., device 110) along the multi-hop link may not be visible to controller 102 along the control plane, controller 102 can assume that an uncontrolled network device exists if there are no other controlled network devices between the first controlled network device and the third controlled network device along the multi-hop link.

Method 154 further includes a step 160 of determining whether the second controlled network device is connected to the third controlled network device through a third multi-hop bi-directional link (e.g., the link formed by link 126 and link 124) that contains an uncontrolled network device. As described above, although the identity of the uncontrolled network device (e.g., device 110) along the multi-hop link may not be visible to controller 102 along the control plane, controller 102 can assume that an uncontrolled network device exists if there are no other controlled network devices between the first controlled network device and the third controlled network device along the multi-hop link.

The determinations of steps 156, 158, and/or 160, can for example be based on topological link data obtained by the network controller from the control plane of the network for the first controlled network device and the second controlled network device. For example, steps 156, 158, and/or 160 can be determined based on information from a MAC table for one of the controlled network devices (e.g., device 106 in step 156) and information from a MAC table for another of the controlled network devices (e.g., device 108 in step 156).

Steps 156, 158, and/or 160 can, for example, including querying the first controlled network device, the second controlled network device, and the third controlled network device to determine direct and indirect communication links to the first, second, and third controlled network devices. In some implementations, first, second, and third devices are not queried in order to determine the communication links between the devices. For example, in some implementations, information regarding the communication links between these devices is provided to computing system 136 through another source with access to the control plane of these devices.

Method 154 includes a step 162 of designating the first, second, and third controlled network devices as being connected to a cloud (e.g., cloud 134 in FIG. 1) containing an uncontrolled network device when it is determined that the first, second, and third controlled network devices are linked to each other through first, second, and third multi-hop bi-directional links that contain an uncontrolled network device. Step 162 can include, for example, determining, based on Media Access Control (MAC) address and link layer discovery information for each controlled network device, a set of uncontrolled network devices that are contained in the fully-connected cloud. In some implementations, step 162 can be based on another suitable addressing scheme, such as for example, an Internet Protocol (IP) address or Address Resolution Protocol (ARP). In some implementations, step 162 includes assigning a number corresponding to the number of devices in the set of uncontrolled network devices contained in the cloud as a lower bound for a total number of uncontrolled network devices contained in the cloud. For example, if computing system 136 is aware of two uncontrolled network devices within a given cloud, it can designate the number "2" as a lower bound for the total number of uncontrolled network devices in the cloud. In some implementations, this lower bound can be overlaid on the cloud itself (see, e.g., cloud 164 of FIG. 5).

Figure 5:
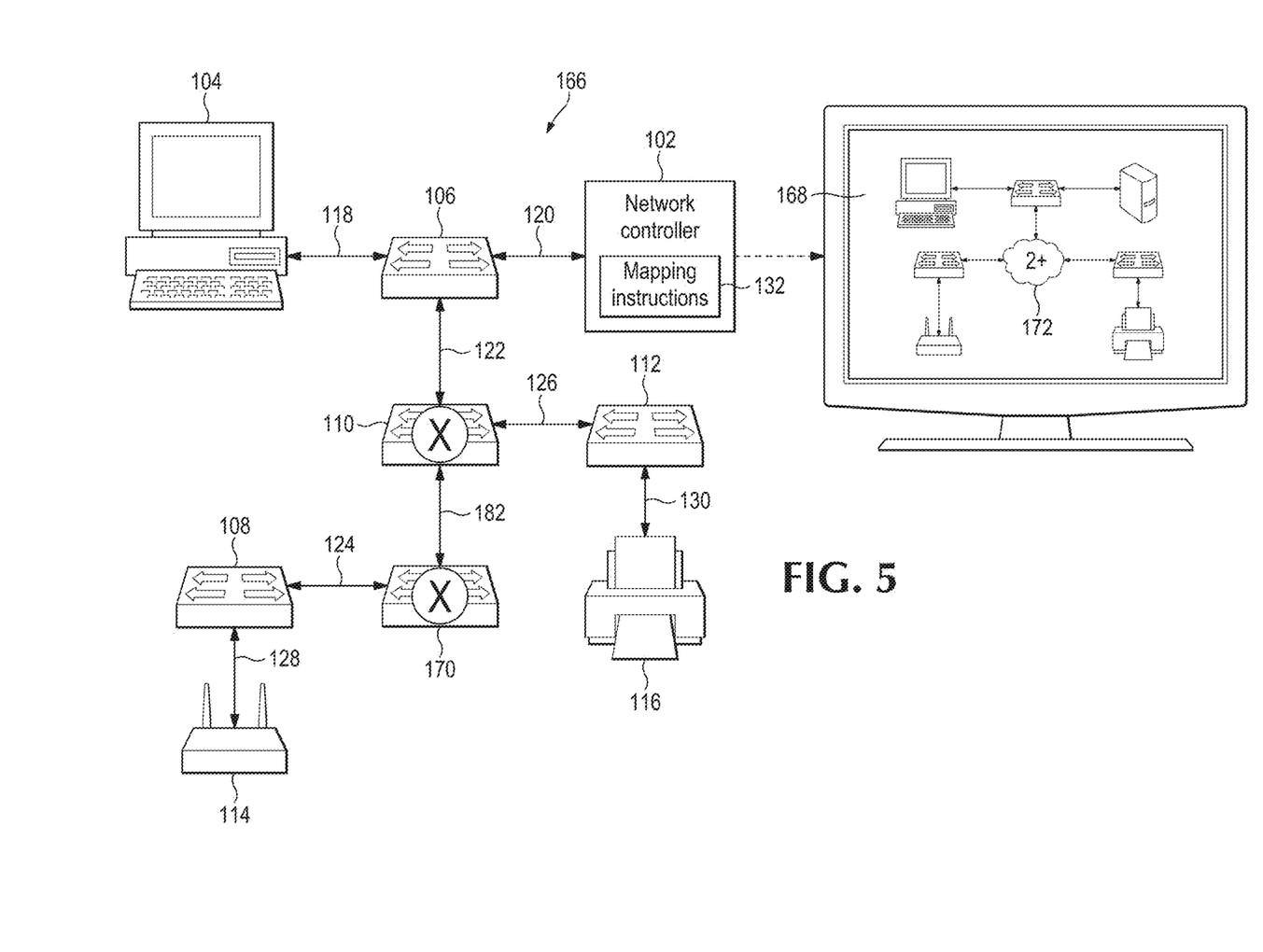
FIG. 5 is a diagram of a computer network with multiple uncontrolled network devices along with an example of a logical topology map of the network.

FIG. 5 illustrates another example of a network 166 in which mapping instructions 132 allow a network controller 102 to determine, based on the topological link data, a set of uncontrolled network devices that are contained in a fully-connected cloud. In this example, a computing system, such as computing system 136 is able to determine a lower bound of uncontrolled network devices that are contained in the fully-connected cloud.

FIG. 5 also depicts another example of a logical topology map 168 according to the present disclosure in which a fully-connected cloud 172 contains uncontrolled network device 110 along with a second uncontrolled network device 170. A corresponding new link 182 between uncontrolled device 110 and controlled device 108 is also included in network 166. As shown in FIG. 5, cloud 172 includes the label "2+" to indicate that two or more uncontrolled network devices are contained within cloud 172.

Figure 6:
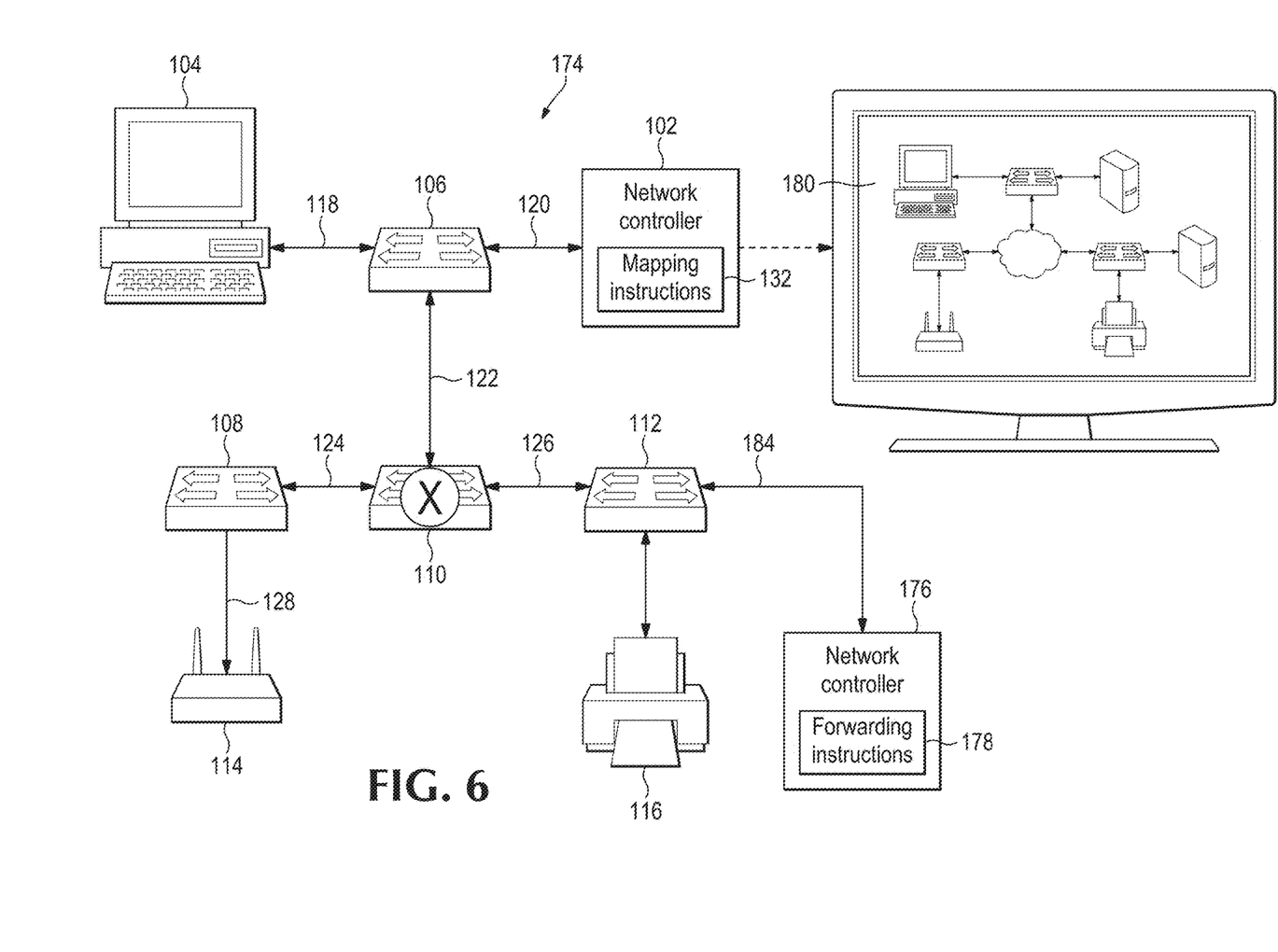
FIG. 6 is a diagram of a computer network with multiple network controllers along with an example of a logical topology map of the network.

FIG. 6 illustrates another example of a network 174 in which a first set of controlled network devices (devices 106 and 108) is within the control plane of a first network controller (controller 102) and a second set of controlled network devices (device 112) is within the control plane of a second network controller 176. As used herein, the term "set of devices" is intended to refer to a set of one or more devices. Network 174 is configured such that the network controllers share topological link data for the first and second sets of controlled network devices in order to map network 166. As illustrated in FIG. 6, a corresponding new link 184 between controlled device 112 and second network controller 176 is also included in network 174.

In some implementations, mapping instructions 132 can determine whether network 166 contains a fully-connected cloud containing an uncontrolled network device based on topological link data for the first and second sets of controlled network devices. In some implementations, second network controller 176 can include forwarding instructions 178 to provide topological link data to network controller 102 to allow network controller 102 to create a topology map 180.

One example of code for mapping instructions 132 is provided below. In this example, the code is separated into two stages: (1) a detection stage and (2) a sizing stage. In the detection stage, one or more fully-connected uncontrolled clouds are determined along with the controlled network devices connected to each cloud. In this example, the detection stage is performed by a network controller (e.g., controller 102) with access to the control plane of the controlled network devices within the network. With reference to the example code below, the controller will have previously determined or been provided information regarding: (1) the network devices it controls, (2) the links between the controlled network devices, (3) whether each link is a single-hop or multi-hop link, and (4) whether each link is bi-directional or uni-directional.

```
void main( ) {
    // Discover all clouds
    Set<Cloud> allClouds = new HashSet<Cloud>( );
```

```
      foreach Device d in allDevices {
        allClouds.add( findClouds(d) );
      }
      // Display discovered clouds
      display(allClouds, allDevices);
   }
   --------------------------------------------------------------
   --
   Set<Cloud> findClouds(Device device) {
      clouds = new HashSet<Cloud>( );
      // Find a potential cloud on each multihop link from this device
      foreach link in device.getLinks( ) {
         if (link.type != MULTIHOP)
            break;
         // Check if there's a cloud on this link by adding the
         // two devices which are linked by a multi-hop link,
         //and seeing if other devices are linked to them.
         cloud = new Cloud( );
         cloud.addLink(cloud, device);
         linkDeviceToCloudAndFindOtherDevices(cloud,
         link.getOtherDevice(device));
         // If there are more than 2 devices (ie: more than just this link)
         // then we found a cloud.
         if (cloud.getLinkedDevices( ).size( ) > 2)
            clouds.add(cloud);
      }
      return clouds;
   }
   ---------------------------------------------------------------
   void linkDeviceToCloudAndFindOtherDevices(Cloud cloud, Device device) {
      // Link the new device to the cloud. Should not already be linked
      // to the cloud.
      assert(!cloud.getLinkedDevices( ).contains(device));
      cloud.addLinkTo(device);
      // For each link from this device, check if the other end of
      // the link is connected to a device that should be linked to
      // the cloud as well.
      foreach link in device.getLinks( ) {
         otherDevice = link.getOtherDevice(device);
            if (!cloud.getLinkedDevices( ).contains(otherDevice)) {
               // Check if this device could be linked to the cloud
               if (canLinkDeviceToCloud(otherDevice, cloud)) {
                  // Link the device to the cloud and recursively
                  // check
                  linkDeviceToCloudAndFindOtherDevices(cloud,
                  otherDevice);
               }
            }
      }
   }
   ---------------------------------------------------------------
   boolean canLinkDeviceToCloud(Device device, Cloud cloud) {
      // The device should not already be linked to the cloud
      assert(!cloud.getLinkedDevices( ).contains(device));
      // if the device is not linked to any device already linked
      // to the cloud, then the device is not linked to the cloud.
      foreach Device d in cloud.getLinkedDevices( ) {
         if (!d.hasLinkTo(device))
            return false;
      }
      // The device is linked to all devices linked to the cloud,
      // so it should be linked to the cloud also.
      return true;
   }
   ---------------------------------------------------------------
```

In the sizing stage, the controlled network devices are queried to determine an estimate of the size of the fully-connected cloud. In this example, the sizing stage includes querying tables on the controlled network devices to determine devices they are aware of that may be contained within the uncontrolled cloud. In this example, this clarification calculation is a lower bound on the number of devices within the uncontrolled cloud. One example of code for an implementation of this sizing stage is provided below:

```
int findCloudSize(Cloud cloud) {
   Set<MacAddress> cloudMacs = new HashSet<MacAddress>( );
   // Get the MAC table from each device
   Set<MacAddress> macsOutsideCloud = new HashSet<MacAddress>( );
   Map<Device,MacTable> macTableHash = new HashMap<Device,MacTable>( );
   foreach Device d in cloud.getLinkedDevices( ) {
      MacTable macTable = getDeviceMacTable(d);
         macTableHash.store(d, macTable);
      // Store each MAC address in our set of MACs outside the
      // cloud if the MAC is located on a non-cloud port of the device.
      foreach MacAddress m in macTable {
         if (!d.getLinksToCloud( ).contains(m.port))
            macsOutsideCloud.add(m);
      }
   }
}
// For each device, figure out which MAC addresses it knows
// about that we think are in the cloud. Add those MAC addresses
// to our collection of MACs within the cloud.
foreach Device d in cloud.getLinkedDevices( ) {
   Link cloudLink = d.getLinkToCloud(cloud);
   // Learn cloud size through LLDP
   LldpTable lldpTable = getDeviceLLDPtable(d);
   foreach LLdpTableEntry e in lldpTable {
      if (cloudLink.port == e.port)
         cloudMacs.add(e.macAddress);
   }
   // Learn cloud size through device MAC table by considering
   // each MAC to be IN the cloud if it is not OUTSIDE the cloud.
   // We know a MAC is outside the cloud if a device connected
   // to the cloud had the MAC on a non-cloud port.
   MacTable macTable = macTableHash.get(d);
   foreach MacAddress m in macTable {
      // Check if the device is outside the cloud. If not, then
      // add it to the set of MACs inside the cloud.
      if (!macsOutsideCloud.contains(m))
         cloudMacs.add(m);
   }
}
// Give the lower bound of MACs within the cloud
return cloudMacs.size( );
}
```

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. As but one example, data storage module 148 of computing system 136 can include aspects of mapping module 150 and vice versa.

As used herein, the term "provide" includes push mechanisms (e.g., sending data independent of a request for that data), pull mechanisms (e.g., delivering data in response to a request for that data), and store mechanisms (e.g., storing data at an intermediary at which the data can be accessed). Furthermore, as used herein, the term "based on" means "based at least in part on." Thus, a feature that is described based on some cause, can be based only on the cause, or based on that cause and on one or more other causes.

Furthermore, it should be understood that the systems, apparatuses, and methods described herein can include various combinations and/or sub-combinations of the components and/or features of the different implementations described. Thus, features described with reference to one or more implementations can be combined with other implementations described herein.

What is claimed is:
1. A system comprising:
a processor; and
a non-transitory storage medium storing instructions executable on the processor to:
determine whether a network contains a fully-connected cloud containing an uncontrolled network device based on topological link data of controlled network devices in the network, the controlled network devices controlled by a network controller of the network, and the uncontrolled network device not controlled by the network controller,
wherein the topological link data indicates: (1) which controlled network devices are linked together, (2) whether links between the controlled network devices are single-hop or multi-hop, and (3) whether the links between the controlled network devices are bi-directional or uni-directional;

generate a topology map of network devices that includes the fully-connected cloud; and present the topology map in a graphical user interface for troubleshooting a connectivity issue in the network.

2. The system of claim 1, wherein the network controller is a software-defined network (SDN) network controller that controls the controlled network devices.

3. The system of claim 1, wherein the network controller is a first network controller, and wherein the controlled network devices are part of a first set of controlled network devices controlled by the first network controller, and wherein a second set of controlled network devices is controlled by a second network controller, and wherein the instructions are executable on the processor to determine whether the network contains the fully-connected cloud containing the uncontrolled network device based on topological link data for the first and second sets of controlled network devices.

4. The system of claim 1, wherein the instructions are executable on the processor to determine the topological link data of the controlled network devices by querying the controlled network devices.

5. The system of claim 1, wherein the topological link data of the controlled network devices includes information regarding which port of a controlled network device is used for communicating with another controlled network device.

6. The system of claim 1, wherein the instructions are executable on the processor to:

determine, based on the topological link data, a set of uncontrolled network devices that is contained in the fully-connected cloud.

7. The system of claim 1, wherein the topology map identifies controlled network devices connected to the fully-connected cloud.

8. The system of claim 2, comprising the SDN network controller.

9. The system of claim 8, wherein the SDN network controller is to control the controlled network devices using an OpenFlow protocol.

10. A method executed by a system comprising a processor, comprising:

determining whether a first controlled network device in a network is connected to a second controlled network device in the network through a first multi-hop bi-directional link that contains an uncontrolled network device;

determining whether the first controlled network device is connected to a third controlled network device in the network through a second multi-hop bi-directional link that contains the uncontrolled network device;

determining whether the second controlled network device is connected to the third controlled network device through a third multi-hop bi-directional link that contains the uncontrolled network device;

designating the first, second, and third controlled network devices as being connected to a cloud containing the uncontrolled network device in response to determining that the first, second, and third controlled network devices are linked to each other through first, second, and third multi-hop bi-directional links, the first, second, and third controlled network devices controlled by a network controller of the network, and the uncontrolled network device not controlled by the network controller;

generating a topology map of network devices that includes the cloud interconnecting the first, second, and third controlled network devices; and presenting the topology map in a graphical user interface for troubleshooting a connectivity issue in the network.

11. The method of claim 10, wherein determining whether the first controlled network device is connected to the second controlled network device through the first multi-hop link that contains the uncontrolled network device is based on information from a Media Access Control (MAC) table for the first controlled network device and information from a MAC table for the second controlled network device.

12. The method of claim 10, wherein determining whether the first controlled network device is connected to the second controlled network device through the first multi-hop link that contains the uncontrolled network device includes determining, based on information from a Media Access Control (MAC) table for the first controlled network device, whether the uncontrolled network device is assigned a port value that is the same as a port value assigned to the second controlled network device.

13. The method of claim 10, further comprising:

querying the first controlled network device, the second controlled network device, and the third controlled network device to determine direct and indirect links to the first, second, and third controlled network devices.

14. The method of claim 10, further comprising:

determining, based on Media Access Control (MAC) address and link layer discovery information for each controlled network device, a set of uncontrolled network devices that is contained in the cloud.

15. The method of claim 14, further comprising:

assigning a number corresponding to the number of devices in the set of uncontrolled network devices contained in the cloud as a lower bound for a total number of uncontrolled network devices contained in the cloud.

16. The method of claim 10, wherein the network controller is a software-defined network (SDN) network controller that controls the first, second, and third controlled network devices.

17. A non-transitory machine-readable storage medium encoded with instructions that upon execution cause a system to:

determine based on link data for three controlled network devices whether the three controlled network devices are connected to each other through respective multi-hop bi-directional links that each contain an uncontrolled network device, the three controlled network devices controlled by a network controller of the network, and the uncontrolled network device not controlled by the network controller;

designate the three controlled network devices as being connected to a cloud containing the uncontrolled network device;

generate a topology map of network devices that includes the cloud interconnecting the three controlled network devices; and present the topology map in a graphical user interface for troubleshooting a connectivity issue in the network.

18. The non-transitory machine-readable storage medium of claim 17, comprising:
the link data for the three controlled network devices.

19. The non-transitory machine-readable storage medium of claim 17, wherein the network controller is a software-defined network (SDN) network controller that controls the three controlled network devices.

20. The non-transitory machine-readable storage medium of claim 19, wherein the SDN network controller is to control the three controlled network devices using an OpenFlow protocol.

* * * * *